(12) United States Patent
Kozono et al.

(10) Patent No.: US 12,741,533 B2
(45) Date of Patent: Sep. 22, 2026

(54) DISPLAY CONTROL DEVICE FOR VEHICLE, DISPLAY METHOD FOR VEHICLE, AND NON-TRANSITORY RECORDING MEDIUM FOR VEHICLE

(71) Applicant: TOYOTA JIDOSHA KABUSHIKI KAISHA, Toyota (JP)

(72) Inventors: Yuki Kozono, Okazaki (JP); Shu Nakajima, Toyota (JP); Keigo Hori, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 239 days.

(21) Appl. No.: 18/325,720

(22) Filed: May 30, 2023

(65) Prior Publication Data

US 2024/0025254 A1 Jan. 25, 2024

(30) Foreign Application Priority Data

Jul. 21, 2022 (JP) ................................ 2022-116753

(51) Int. Cl.
*G06F 3/0488* (2022.01)
*B60K 35/22* (2024.01)
(Continued)

(52) U.S. Cl.
CPC .......... *B60K 35/22* (2024.01); *G06F 3/04817* (2013.01); *G06F 3/0488* (2013.01);
(Continued)

(58) Field of Classification Search
CPC ........ B60K 35/00; B60K 35/10; B60K 35/60; B60K 2360/119; B60K 2360/1446;
(Continued)

(56) References Cited

U.S. PATENT DOCUMENTS

| | | | | |
|---|---|---|---|---|
| 2005/0046279 A1* | 3/2005 | Dunn | .................... | B62D 1/046 307/10.8 |
| 2009/0167515 A1* | 7/2009 | Scherzinger | .......... | B60K 35/29 340/539.1 |

(Continued)

FOREIGN PATENT DOCUMENTS

| | | |
|---|---|---|
| JP | 2020-057540 A | 4/2020 |

OTHER PUBLICATIONS

U.S. Appl. No. 18/304,420, filed Apr. 21, 2023.

*Primary Examiner* — Phuong H Nguyen
(74) *Attorney, Agent, or Firm* — Oliff PLC

(57) ABSTRACT

A display control device for a vehicle includes a memory, and at least one processor connected to the memory. The processor displays, on a display portion provided at a front side of a driver's seat, plural icons corresponding to a steering switch group that has a touch-sensor-type first switch and a non-touch-sensor-type second switch. The plural icons include a first icon corresponding to the first switch and a second icon corresponding to the second switch. In a case in which a touch operation of the first switch is sensed, the processor displays both the first icon and the second icon, and, in a case in which a non-touch operation of the second switch is sensed, the processor sets both the first icon and the second icon in non-displayed states.

6 Claims, 9 Drawing Sheets

(51) Int. Cl.
*G06F 3/04817* (2022.01)
*B60K 35/10* (2024.01)
*B60K 35/60* (2024.01)

(52) U.S. Cl.
CPC .............. *B60K 35/10* (2024.01); *B60K 35/60* (2024.01); *B60K 2360/119* (2024.01); *B60K 2360/1446* (2024.01); *B60K 2360/1468* (2024.01); *B60K 2360/782* (2024.01)

(58) Field of Classification Search
CPC ...... B60K 2360/1468; B60K 2360/782; B60K 35/22; G06F 3/04817; G06F 3/0488
See application file for complete search history.

(56) References Cited

U.S. PATENT DOCUMENTS

2010/0268426 A1* 10/2010 Pathak ................ G06F 3/04886 345/173
2014/0371987 A1* 12/2014 Van Wiemeersch ... B62D 1/046 701/41
2016/0023604 A1* 1/2016 Jenson .................. G06F 3/0482 345/7
2019/0152319 A1* 5/2019 Wan ....................... B60K 35/00
2019/0263439 A1* 8/2019 Pramsoler ............. G06F 3/0202
2019/0291769 A1* 9/2019 Kim ...................... G06F 3/0482
2020/0307377 A1* 10/2020 Tsay ....................... B60K 35/80
2020/0339174 A1* 10/2020 Sakamaki .............. B62D 1/046
2022/0139647 A1* 5/2022 Mizuno .................. B60K 35/10 345/173
2022/0408142 A1* 12/2022 Hinckley .............. G06F 3/1423
2024/0025254 A1* 1/2024 Kozono ................ G06F 3/0488
2025/0033476 A1* 1/2025 Pirkey .................... B60K 35/10

* cited by examiner 18A
40
20R
40A
42
40C
49
18C
40B
46
44
40D
18B
50C
18
18C
52B
50B
54
52
50D
52A
50A
50
20L
18A 19
60
62
64
66
70
72
M1
M2
M3
M4
M5
M6
M7
M8
M9
M10
M11
M12
DISP
DISP
TEMP
TEMP

DISPLAY CONTROL DEVICE FOR VEHICLE, DISPLAY METHOD FOR VEHICLE, AND NON-TRANSITORY RECORDING MEDIUM FOR VEHICLE

CROSS-REFERENCE TO RELATED APPLICATION

This application is based on and claims priority under 35 USC 119 from Japanese Patent Application No. 2022-116753 filed on Jul. 21, 2022, the disclosure of which is incorporated by reference herein.

BACKGROUND

Technical Field

The present disclosure relates to a display control device for a vehicle, a display method for a vehicle, and a non-transitory recording medium for a vehicle.

Related Art

Japanese Patent Application Laid-Open (JP-A) No. 2020-057540 discloses an operation device in which plural switches are provided at a steering wheel. In this operation device, the functions assigned to the plural switches are displayed as images on the front windshield by a head-up display.

Further, in this operation device, a touch switch (a cross-shaped switch) that detects touch operations is provided adjacent to a push switch that detects push operations.

By displaying the functions assigned to plural switches on the front windshield as images as in the operation device disclosed in JP-A No. 2020-057540, it is easy for the vehicle occupant to operate an arbitrary switch in a state in which his/her sightline is directed forward. However, in the images corresponding to the push switch and the images corresponding to the touch switch, it is not possible to recognize that the types of the switches are different merely by looking at the images that are displayed on the display of the front windshield. Therefore, there is the possibility that, due to the vehicle occupant mistakenly identifying the type of switch and carrying out an erroneous input operation, the sense of unease that the intended operation was not accepted will be imparted to the vehicle occupant.

SUMMARY

In view of the above-described circumstances, an object of the present disclosure is to provide a display control device for a vehicle, a display method for a vehicle, and a non-transitory recording medium for a vehicle that can suppress the mistaken identification of a switch by a vehicle occupant even without the vehicle occupant greatly moving his/her sightline while driving.

A display control device for a vehicle relating to a first aspect of the present disclosure is a display control device for a vehicle displaying, on a display portion provided at a front side of a driver's seat, plural icons corresponding to a steering switch group that has a touch-sensor-type first switch and a non-touch-sensor-type second switch, wherein the plural icons include a first icon corresponding to the first switch and a second icon corresponding to the second switch, and the display control device for a vehicle has a display control section that, in a case in which a touch operation of the first switch is sensed, displays both the first icon and the second icon, and, in a case in which a non-touch operation of the second switch is sensed, sets both the first icon and the second icon in non-displayed states.

In the display control device for a vehicle relating to a first aspect of the present disclosure, plural icons are displayed on the display portion that is provided at the front side of the driver's seat. The plural icons correspond to a steering switch group that has a touch-sensor-type first switch and a non-touch-sensor-type second switch. Due thereto, a vehicle occupant can operate an arbitrary switch while looking at the display portion, and without directing his/her eyes toward the steering switch group.

The first icon corresponding to the first switch and the second icon corresponding to the second switch are included in the plural icons. In a case in which a touch operation of the first switch is sensed, both the first icon and the second icon are displayed on the display portion. Due thereto, at the touch-sensor-type first switch at which it is difficult to obtain an operational feeling from the tactile sensation, due to the first icon that is displayed on the display portion being grasped visually, the operability is good, and the type of switch can be understood. Further, it is easy to grasp the existence of the second switch due to the display of the second icon in the state in which the vehicle occupant has touched the first switch. Therefore, the movement from the first switch toward the second switch can be made to be smooth.

On the other hand, in a case in which a non-touch operation of the second switch is sensed, both the first icon and the second icon are set in non-displayed states at the display portion. Due thereto, at the time of operation of the non-touch-sensor-type second switch, the amount of information obtained from the display portion is reduced, and due thereto, it is easy for the vehicle occupant to rely on information obtained by tactile perception by using his/her operating finger or the like. As a result, by making it easy to feel the tactile sensation of the surface of the non-touch-sensor-type second switch, the operability is good, and the type of the switch can be understood.

In this way, in the display control device for a vehicle, mistaken identification of the type of switch can be suppressed without the vehicle occupant greatly moving his/her sightline during driving.

In a display control device for a vehicle relating to a second aspect of the present disclosure, in the structure of the first aspect, in a case in which a touch operation of the first switch is sensed, the display control section displays the first icon corresponding to the first switch so as to be emphasized more than the second icon, and displays operation information relating to an onboard device that is assigned to the first switch.

In a case in which a touch operation of the first switch is sensed, the display control device for a vehicle displays the first icon so as to be emphasized more than the second icon. Further, the display control device for a vehicle displays operation information relating to the onboard device that is assigned to the first switch. Due thereto, even in a case in which both the first icon and the second icon are displayed on the display portion, due to the emphasized display of the first icon, it can be intuitively grasped that operation of the first switch has been carried out. Moreover, the vehicle occupant can grasp the assigned onboard device by looking at the operation information.

Note that what is called "onboard device" here is a concept that includes for example, in addition to equipment such as the air conditioner, the audio system, the car navigation system, a voice input device and the like, also travel assist equipment such as the ACC (Adaptive Cruise Control), the LTA (Lane Tracing Assist) and the like.

In a display control device for a vehicle relating to a third aspect of the present disclosure, in the structure of the first or second aspect, in a case in which a touch operation, in which an operating finger of a vehicle occupant slides on a surface of the first switch in a direction in which the second switch is located, is sensed, the display control section sets the first icon and the second icon in non-displayed states. Further, the display control section displays operation information relating to an onboard device assigned to the second switch.

In the display control device for a vehicle relating to the third aspect of the present disclosure, in a case in which it is sensed that an operating finger of a vehicle occupant has slid on the surface of the first switch in the direction in which the second switch is located, the first icon and the second icon are set in non-displayed states, and operation information relating to the onboard device that is assigned to the second switch is displayed. Due thereto, operation of the second switch is predicted, and operation information of the second switch can be presented to the vehicle occupant in advance.

In a display control device for a vehicle relating to a fourth aspect of the present disclosure, in the structure of the first aspect, the first switch is structured such that an onboard device assigned to the first switch can be changed due to switching of a layer displayed on the display portion, and when an onboard device, which is related to an onboard device assigned to the second switch, is assigned to the first switch, in a case in which a touch operation of the first switch is sensed, the display control section displays both the first icon and the second icon, and when an onboard device, which is not related to an onboard device assigned to the second switch, is assigned to the first switch, in a case in which a touch operation of the first switch is sensed, the display control section displays the first icon and sets the second icon in a non-displayed state.

In the display control device for a vehicle relating to the fourth aspect of the present disclosure, the onboard device assigned to the first switch can be changed by switching the layer displayed on the display portion. Further, in a case in which the onboard device that is assigned to the first switch is related to the onboard device that is assigned to the second switch, both the first icon and the second icon are displayed on the display portion. Due thereto, in a case in which there is a strong possibility that the second switch will be operated after the first switch is operated, the icon corresponding to the second switch can be displayed.

On the other hand, in a case in which the onboard device assigned to the first switch is not related to the onboard device assigned to the second switch, the first icon is displayed on the display portion, and the second icon is set in a non-displayed state. Due thereto, in a case in which the possibility that the second switch will be operated after the first switch is operated is low, the displayed contents can be made to be easy to understand by hiding display of the icon that has low priority.

A display method for a vehicle relating to a fifth aspect of the present disclosure is a display method for a vehicle that displays, on a display portion provided at a front side of a driver's seat, plural icons corresponding to a steering switch group that has a touch-sensor-type first switch and a non-touch-sensor-type second switch, wherein the plural icons include a first icon corresponding to the first switch and a second icon corresponding to the second switch, and, in a case in which a touch operation of the first switch is sensed, the method displays both the first icon and the second icon, and, in a case in which a non-touch operation of the second switch is sensed, the method sets both the first icon and the second icon in non-displayed states.

A non-transitory recording medium for a vehicle relating to a sixth aspect of the present disclosure records a program for displaying, on a display portion provided at a front side of a driver's seat, plural icons corresponding to a steering switch group that has a touch-sensor-type first switch and a non-touch-sensor-type second switch, the plural icons including a first icon corresponding to the first switch and a second icon corresponding to the second switch, and the program is for causing a computer to execute a processing of, in a case in which a touch operation of the first switch is sensed, displaying both the first icon and the second icon, and, in a case in which a non-touch operation of the second switch is sensed, setting both the first icon and the second icon in non-displayed states.

As described above, the display control device for a vehicle, the display method for a vehicle, and the non-transitory recording medium for a vehicle relating to the present invention have the excellent effect of being able to suppress a vehicle occupant mistakenly identifying a switch even without the vehicle occupant greatly moving his/her sightline while driving.

BRIEF DESCRIPTION OF THE DRAWINGS

Exemplary embodiments of the present invention will be described in detail based on the following figures, wherein.

DETAILED DESCRIPTION

Figure 1:
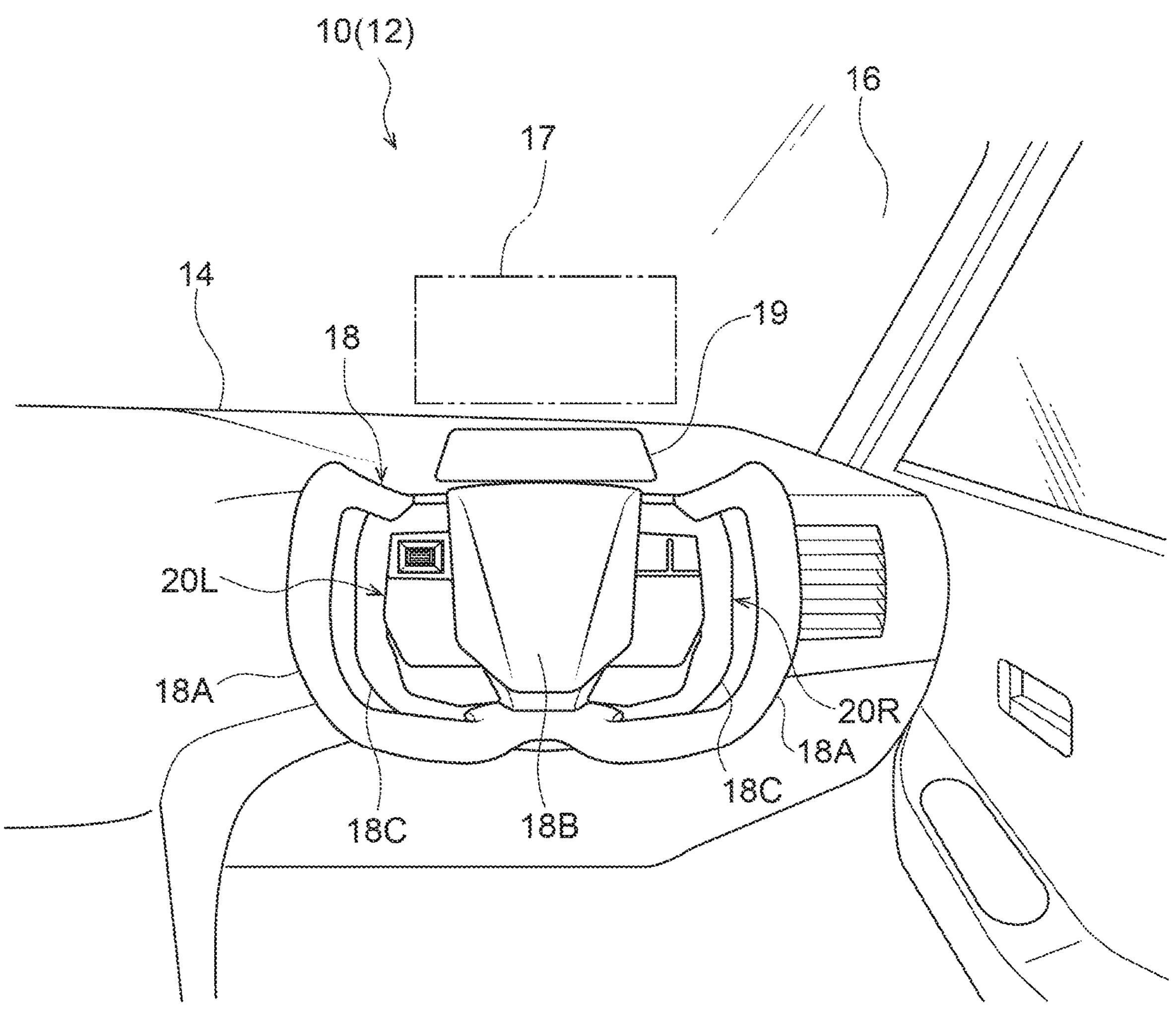
FIG. 1 is a drawing in which the front portion of a cabin of a vehicle, to which a display control device for a vehicle relating to a present embodiment is applied, is seen from a vehicle rear side.

A display control device 10 for a vehicle relating to a present embodiment is described hereinafter with reference to FIG. 1 through FIG. 9. As illustrated in FIG. 1, an instrument panel 14 is disposed at the front portion of the cabin of a vehicle 12 to which the display control device 10 for a vehicle of the present embodiment is applied. A windshield glass 16 is disposed at the front end portion of the instrument panel 14. The windshield glass 16 extends in the vehicle vertical direction and the vehicle transverse direction, and separates the vehicle cabin interior and the vehicle cabin exterior.

A display screen 17 is set at the windshield glass 16. The display screen 17 is a projection surface at which images are projected from a head-up display 15 (see FIG. 7) onto a partial region of the windshield glass 16, and is set at a region of the windshield glass 16 which region is at the vehicle front side of the driver's seat.

A gauge display 19 is provided at the driver's seat side (the vehicle right side) of the instrument panel 14. Information relating to the traveling of the vehicle 12 such as the vehicle speed, the engine speed, the traveled distance and the like, and information relating to states of the vehicle 12 such as warning lamps, the operated states of the lights and the like, can be displayed in the gauge display 19. The gauge display 19 is provided at the vehicle front side of the driver's seat and at the upper side of a steering wheel 18 that is described hereinafter.

The steering wheel 18 is provided via an unillustrated steering column at the instrument panel 14, at the lower side of the gauge display 19. The steering wheel 18 has a pair of rim portions 18A that are provided at the left and right in the vehicle transverse direction. The pair of rim portions 18A are respectively formed in the shapes of circular arcs that are convex toward the vehicle transverse direction outer sides, and are provided so as to protrude-out toward the left and the right. The vehicle occupant in the driver's seat grasps the pair of rim portions 18A with his/her left and right hands, and carries out steering of the steering wheel 18.

A hub portion 18B that structures the central portion is provided between the pair of rim portions 18A. The rim portions 18A and the hub portion 18B are connected by plural (two in the present embodiment) spoke portions 18C.

The spoke portions 18C are provided at two places, which are between the right-side rim portion 18A and the hub portion 18B, and between the left-side rim portion 18A and the hub portion 18B. Here, a right-side switch 20R is provided at the spoke portion 18C that is between the right-side rim portion 18A and the hub portion 18B. Further, a left-side switch 20L is provided at the spoke portion 18C that is between the left-side rim portion 18A and the hub portion 18B. Details of the right-side switch 20R and the left-side switch 20L are described later.

Each of the right-side switch 20R and the left-side switch 20L structures a steering switch group that includes plural switches. The present embodiment is structured such that, when operations with respect to the right-side switch 20R and the left-side switch 20L are sensed by the display control device 10 for a vehicle, plural icons corresponding to the respective switches are displayed on a display portion provided at the front side of the driver's seat.

As examples, the above-described display screen 17 of the windshield glass 16 and gauge display 19 of the instrument panel 14 can be used as the display portion. The display portion of the present embodiment is, as an example, the gauge display 19.

(Hardware Structures)

Figure 7:
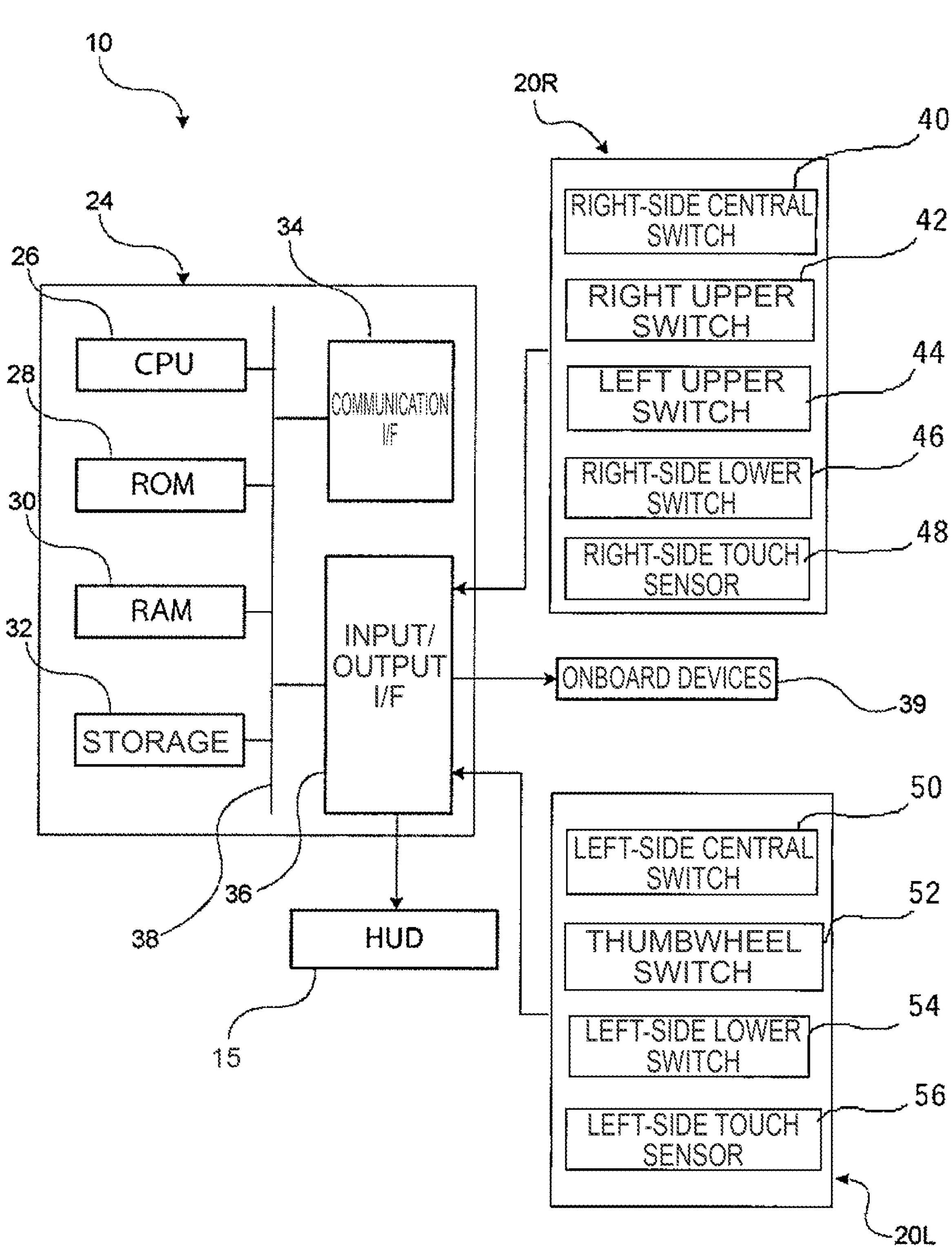
FIG. 7 is a block drawing illustrating hardware structures of the display control device for a vehicle relating to the present embodiment.

FIG. 7 is a block drawing illustrating hardware structures of the display control device 10 for a vehicle. As illustrated in FIG. 7, the display control device 10 for a vehicle is structured to include a CPU (Central Processing Unit: processor) 26, a ROM (Read Only Memory) 28, a RAM (Random Access Memory) 30, a storage 32, a communication interface 34 and an input/output interface 36. These respective structures are connected so as to be able to communicate with one another via bus 38.

The CPU 26 is a central computing processing unit, and executes various programs and controls respective sections. Namely, the CPU 26 reads-out a program from the ROM 28 or the storage 32, and executes the program by using the RAM 30 as a workspace. The CPU 26 carries out control of the above-described respective structures, and various computing processings, in accordance with programs recorded in the ROM 28 or the storage 32.

The ROM 28 stores various programs and various data. The RAM 30 temporarily stores programs and data as a workspace. The storage 32 is structured by an HDD (Hard Disk Drive) or an SSD (Solid State Drive), and stores various programs, including the operating system, and various data.

The communication interface 34 is an interface for the ECU 24 to communicate with a server and other devices. Standards such as, for example, Ethernet®, FDDI, Wi-Fi® or the like are used at the communication interface 34.

The HUD (head-up display) 15, onboard devices 39, the right-side switch 20R and the left-side switch 20L are connected to the input/output interface 36. Specifically, the input/output interface 36 is connected to the HUD 19 that projects images onto the display screen 17. The input/output interface 36 receives signals from the CPU 26, and images are projected from the HUD 19 onto the display screen 17. Further, the onboard devices 39 are a generic term that includes, in addition to equipment such as the air conditioner, the audio system, the car navigation system, a voice input device and the like, also travel assist equipment such as the ACC (Adaptive Cruise Control), the LTA (Lane Tracing Assist) and the like.

(Steering Switch Groups)

The right-side switch 20R is structured by plural, touch-sensor-type touch switches. Specifically, the right-side switch 20R has a right-side central switch 40 located in the center, a right upper switch 42 located at the upper right, a left upper switch 44 located at the upper left, and a right-side lower switch 46 located at the lower portion.

Further, the right-side switch 20R has a right-side touch sensor 48 that senses touch operations of the respective switches of the right-side switch 20R. The right-side touch sensor 48 is structured by, for example, an electrostatic-capacitance-type electrostatic sensor, and can sense the contact of an operating finger on the surface of the right-side switch 20R.

Figure 2:
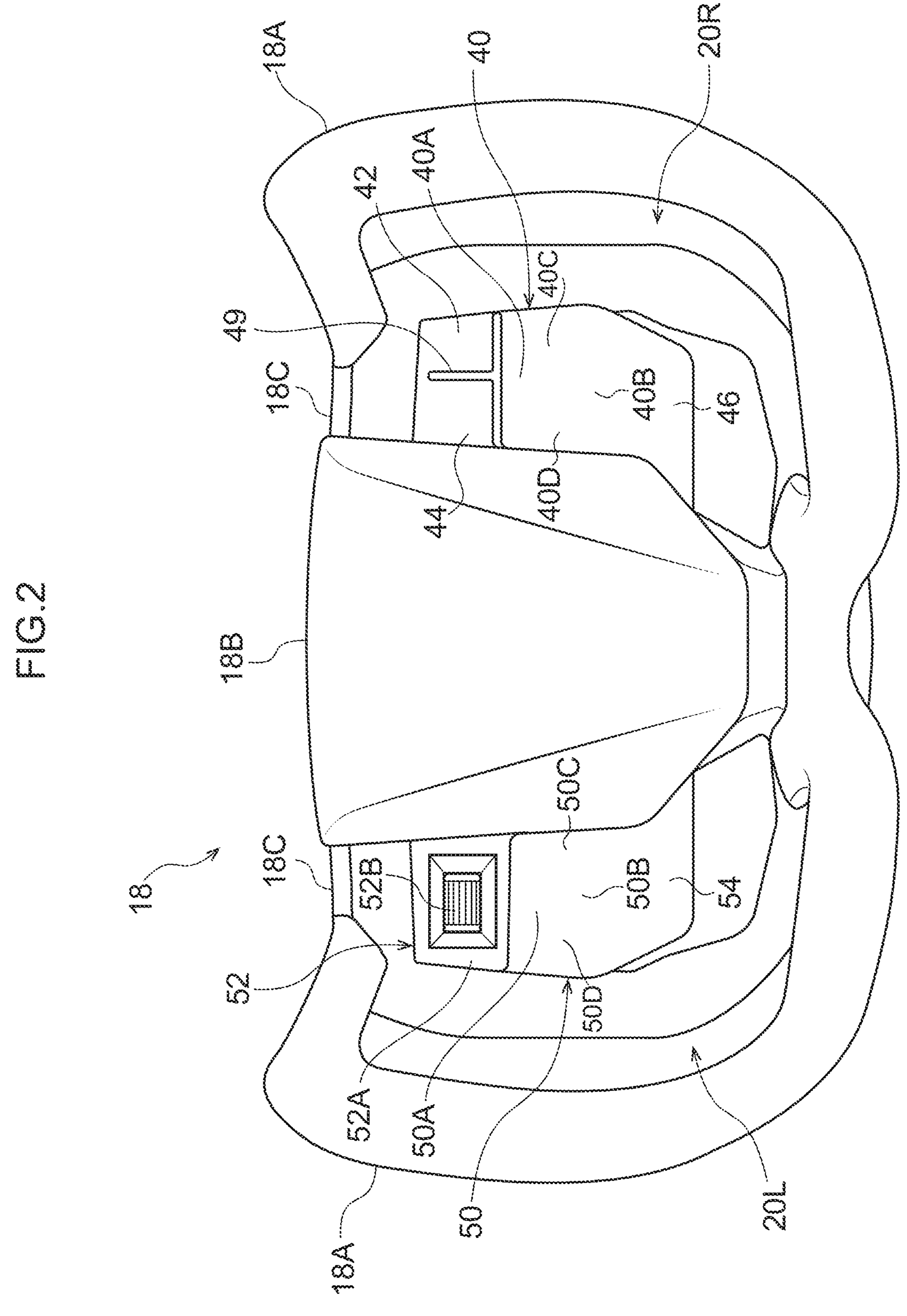
FIG. 2 is an enlarged view of main portions in which a portion of a steering wheel in FIG. 1 is enlarged.

As illustrated in FIG. 2, the right-side central switch 40 has an operation surface that is substantially rectangular, and the upper, lower, right and left respective regions thereof are an upper switch 40A, a lower switch 40B, a right switch 40C and a left switch 40D. These sensor switches are used mainly at the time of operating the travel assist equipment that are centered around the gauge display of the various onboard devices.

Note that, in a case in which the images (icons or characters expressing the respective switches) that are displayed on the gauge display 19 are switched, different functions are assigned to the upper switch 40A, the lower switch 40B, the right switch 40C and the left switch 40D.

The right upper switch 42 is located at the upper right of the right-side central switch and has an operation surface that is substantially rectangular and has a width that is approximately ½ of that of the operation surface of the right-side central switch 40. The function of operating the ACC is assigned to this right upper switch 42.

The left upper switch 44 is located at the upper left of the right-side central switch and has an operation surface that is substantially rectangular and has a width that is approximately ½ of that of the operation surface of the right-side central switch 40. The function of operating the LTA is assigned to this left upper switch 44.

Note that, in the present embodiment, a distinguishing projection 49, which is shaped as an upside-down T and separates the right-side central switch 40, the right upper switch 42 and the left upper switch 44, is provided on the surface of the right-side switch 20R. Due to a fingertip of the vehicle occupant obtaining the tactile sensation of riding-up over the distinguishing projection 49 on the surface of the right-side switch 20R, the vehicle occupant can operate an arbitrary switch without visually confirming the operation surface of the steering switch.

The right-side lower switch 46 is located at the lower side of the right-side central switch 40, and has an operation surface that is substantially rectangular and has a width equivalent to that of the operation surface of the right-side central switch 40. The function of switching the images (icons or characters) corresponding to the right-side switch 20R that are displayed on the gauge display 19 is assigned to this right-side lower switch 46. Namely, the right-side lower switch 46 switches the layer that is being displayed on the gauge display 19.

On the other hand, as illustrated in FIG. 7, the left-side switch 20L is structured by plural, touch-sensor-type touch switches, and a non-touch-sensor-type switch. Specifically, the left-side switch 20L has a left-side central switch 50 located at the center, a thumbwheel switch 52 located at the upper portion, and a left-side lower switch 54 located at the lower portion.

Further, the left-side switch 20L has a left-side touch sensor 56 that senses touch operations of the left-side central switch 50 and the left-side lower switch 54 that are touch-sensor types. The left-side touch sensor 56 is structured by, for example, an electrostatic-capacitance-type electrostatic sensor, and can sense the contact of an operating finger on the surfaces of the left-side central switch 50 and the left-side lower switch 54.

As illustrated in FIG. 2, the left-side central switch 50 is structured by a touch-sensor-type touch switch. The left-side central switch 50 has an operation surface that is substantially rectangular, and the upper, lower, right and left respective regions thereof are an upper switch 50A, a lower switch 50B, a right switch 50C and a left switch 50D. Note that functions that differ in accordance with the layer displayed on the gauge display 19 are assigned to the upper switch 50A, the lower switch 50B, the right switch 50C and the left switch 50D.

The thumbwheel switch 52 is disposed at the upper side of the left-side central switch 50, and is structured by a non-touch-sensor-type switch. The thumbwheel switch 52 is a rotary switch structured by a known thumbwheel mechanism, and has a thumbwheel 52B that is provided so as to be able to be rotatingly operated through an opening of a switch bezel 52A provided at the spoke portion 18C. Due to output of signals corresponding to the rotating direction and the rotated amount of the thumbwheel 52B, the thumbwheel switch 52 carries out input operations to the onboard device assigned to the switch. In the present embodiment, the function of adjusting the volume of the audio system is assigned to the thumbwheel switch 52.

The left-side lower switch 54 is structured by a touch-sensor-type switch, is disposed at the lower side of the left-side central switch 50, and has an operation surface that is substantially rectangular and has a width equivalent to that of the operation surface of the left-side central switch 50. The function of switching the layer of the images corresponding to the left-side switch 20L that are displayed on the gauge display 19, is assigned to this left-side lower switch 54.

(Functional Structures)

The display control device 10 for a vehicle realizes various functions by using the hardware resources illustrated in FIG. 7. The functional structures realized by the display control device 10 for a vehicle are described with reference to FIG. 8.

Figure 8:
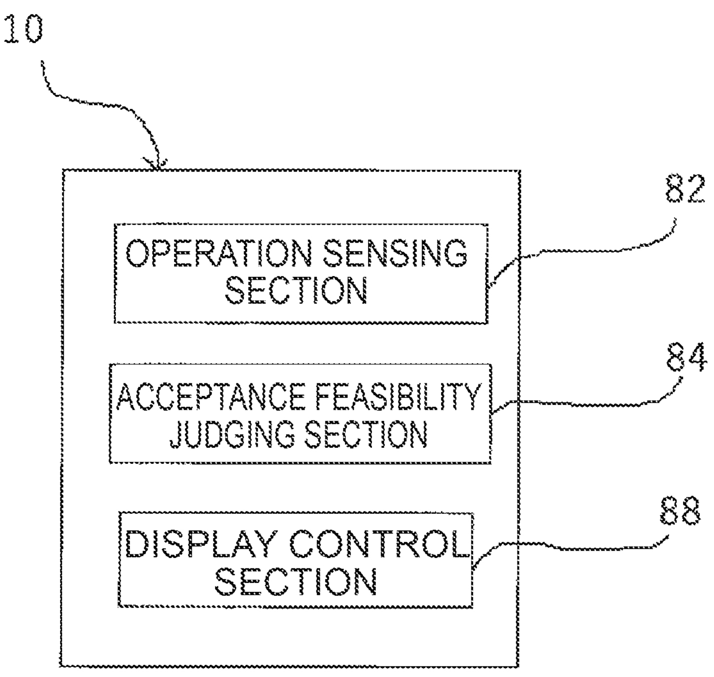
FIG. 8 is a block drawing illustrating functional structures of the display control device for a vehicle relating to the present embodiment.

As illustrated in FIG. 8, the display control device 10 for a vehicle is structured to include, as the functional structures thereof, a communication section 80, an operation sensing section 82, an acceptance feasibility judging section 84 and a display control section 88. These respective functional structures are realized by the CPU 26 reading-out and executing a program stored in the ROM 28 or the storage 32.

The communication section 80 carries out communication with a server, equipment at the exterior of the vehicle, and the like via the communication interface 34.

The operation sensing section 82 senses operation of the right-side switch 20R and the left-side switch 20L. Specifically, due to one of the touch-sensor-type switches of the right-side switch 20R and the left-side switch 20L being operated by touch, the operation sensing section 82 senses the input to the onboard device 39 corresponding to the operated switch. Further, due to the thumbwheel switch 52 (a non-touch-type switch) of the left-side switch 20L being operated, the operation sensing section 82 senses the input to the onboard device 39 corresponding to the thumbwheel switch 52.

Note that the operation sensing section 82 senses "preparatory actions" and "executing actions" as touch operations that are carried out with respect to the touch-sensor-type switches. A "preparatory action" is a touch operation immediately before an input operation to the onboard device 39 is carried out. For example, after a time of a predetermined threshold value or more elapses from the operation of one of the touch-sensor-type switches the previous time, the touch operation that is sensed first may be sensed as a "preparatory action". Further, a touch operation in which the electrostatic capacitance sensed at a touch sensor is less than a predetermined threshold value may be sensed as a "preparatory action". Moreover, a touch operation in which an operating finger is slid on the operation surface of a touch-sensor-type switch, or the like, may be sensed as a "preparatory action".

An "executing action" is a touch operation that is an input operation to the onboard device 39. For example, a "tapping operation" of tapping on the operation surface of the switch, a "long hold operation" of the operation surface being depressed for a long time by a fingertip, or the like may be considered to be "executing actions", and may be sensed while being differentiated from "preparatory actions".

The acceptance feasibility judging section 84 judges whether or not operation is possible, at the time when an input to the onboard device 39 is sensed by the function of the operation sensing section 82. Namely, functions that differ in accordance with the layer displayed on the gauge display 19 are assigned to the right-side central switch 40 and the left-side central switch 50, and therefore, in some layers, the right-side central switch 40 and the left-side central switch 50 are switched to states in which operation is not possible. Further, for each of the right-side central switch 40 and the left-side central switch 50, the acceptance feasibility judging section 84 judges whether or not there is a state in which operation is not possible, which is a state in which input cannot be accepted.

In a case in which a tapping operation is sensed by the function of the operation sensing section 82, the display control section 88 displays images (icons or characters) corresponding to the right-side switch 20R and the left-side switch 20L on the gauge display 19.

(Explanation of Displayed Information)

Figure 3:
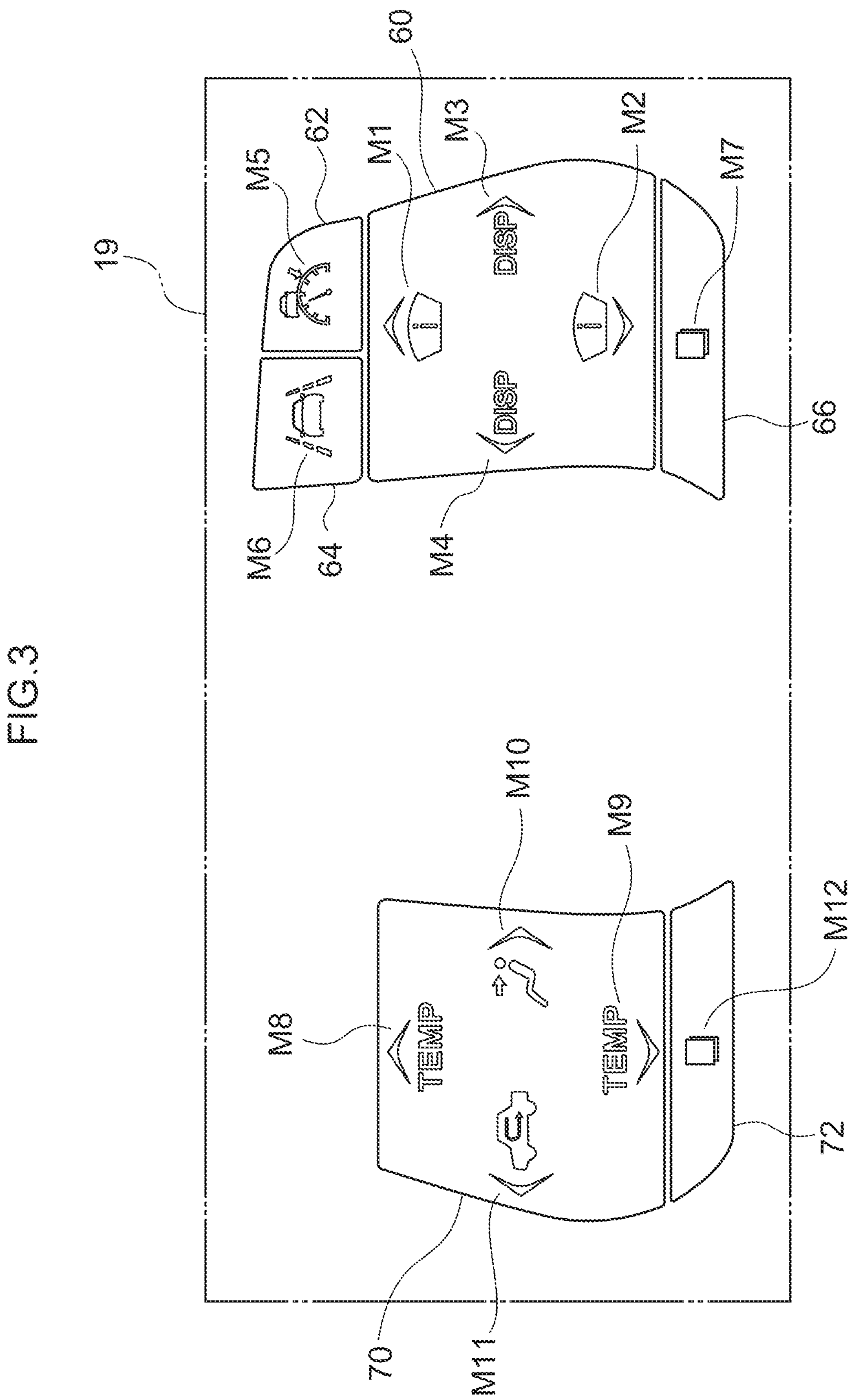
FIG. 3 is a drawing illustrating a display example of a display portion in the present embodiment, and illustrates a first layer of a left-side switch and a first layer of a right-side switch.

An example of displayed information that is displayed on the gauge display 19 of the present embodiment is described here with reference to FIG. 3 through FIG. 6B. An image of a menu screen of a first layer that corresponds to the right-side switch 20R, and an image of a menu screen of a first layer that corresponds to the left-side switch 20L, are illustrated in FIG. 3. These menu screens are structured so as to display plural icons corresponding to the right-side switch 20R and the left-side switch 20L. The display of the plural icons corresponds to the relationship of the placement of the steering switch groups. Further, some of the plural icons are expressed by modeling the appearances of the right-side switch 20R and the left-side switch 20L.

As illustrated in FIG. 3, a right-side central frame portion 60 is displayed at the right side of the gauge display 19. The right-side central frame portion 60 is an icon of an image modeled after the right-side central switch 40. Icons M1 through M4 are displayed in the upper, lower, right and left regions of the right-side central frame portion 60, and correspond to the upper switch 40A, the lower switch 40B, the right switch 40C and the left switch 40D of the right-side central switch 40.

In the present embodiment, the icons M1 and M2 are icons displaying images that model displays in which the letter "i" is displayed near images of arrows indicating the upward and downward directions. The icons M1 and M2 correspond to functions of setting details of the displayed contents on the gauge display 19 and the display screen 17.

The icons M3 and M4 are icons displaying images that model the text "DISP" near images of arrows indicating the leftward and rightward directions. The icons M3 and M4 correspond to functions of carrying out switching of the various gauge displays that are set so as to be able to be displayed on the gauge display 19 and the display screen 17.

A right upper frame portion 62 is displayed at the upper right of the right-side central frame portion 60. The right upper frame portion 62 is an icon modeled after the right upper switch 42. An icon M5 of a shape that is modeled after a vehicle and a gauge is displayed so as to be superposed on the right upper frame portion 62. The icon M5 corresponds to the function of the ACC.

A left upper frame portion 64 is displayed at the upper left of the right-side central frame portion 60. The left upper frame portion 64 is an icon that is modeled after the left upper switch 44. An icon M6 that is modeled after a vehicle and a vehicle lane is displayed so as to be superposed on the left upper frame portion 64. The icon M6 corresponds to the function of the LTA.

Note that the right-side central frame portion 60, the right upper frame portion 62 and the left upper frame portion 64 are displayed in forms of islands with a gap, which corresponds to the shape of the distinguishing projection 49, provided therebetween.

A right-side lower frame portion 66 is displayed beneath the right-side central frame portion 60. The right-side lower frame portion 66 is an icon that is modeled after the right-side lower switch 46. An icon M7 that is modeled after a shape of overlapping rectangles is displayed so as to be superposed on the right-side lower frame portion 66. The icon M7 corresponds to the function of changing the layer of the images (icons or characters) corresponding to the right-side switch 20R. Namely, the onboard devices that are assigned to the right-side switch 20R are changed by switching the display.

On the other hand, a left-side central frame portion 70 is displayed at the left side of the gauge display 19. The left-side central frame portion 70 is an icon of an image modeled after the left-side central switch 50. Due to operation of the left-side lower switch 54, the display of the left-side central frame portion 70 can be switched between the first layer and a second layer.

As illustrated in FIG. 3, in the first layer of the left-side central frame portion 70, icons M8 through M11 are displayed in the upper, lower, right and left regions of the left-side central frame portion 70. These icons M8 through M11 correspond to the upper switch 50A, the lower switch 50B, the right switch 50C and the left switch 50D of the left-side central switch 50.

Mainly operations of the air conditioner of the vehicle are assigned to the icons M8 and M9 that are displayed in the first layer.

The icons M8 and M9 are icons displaying the text "TEMP" near images of arrows indicating the upward and downward directions, and correspond to functions of changing the air conditioning temperature of the air conditioner. The icon M10 is a shape modeled after a vehicle occupant and the blowing direction, and corresponds to the function of changing the blowing direction of the air conditioner. The icon M11 is a shape modeled after a vehicle, and corresponds to the function of circulating internal air.

A left-side lower frame portion 72 is displayed beneath the left-side central frame portion 70. The left-side lower frame portion 72 is an icon that is modeled after the left-side lower switch 54. An icon M12 that is modeled after a shape of overlapping rectangles is displayed so as to be superposed on the left-side lower frame portion 72. The icon M12 corresponds to the function of changing the layer of the images (icons or characters) corresponding to the left-side switch 20L. Namely, the onboard devices that are assigned to the left-side switch 20L are changed by switching the display.

Figure 4A:
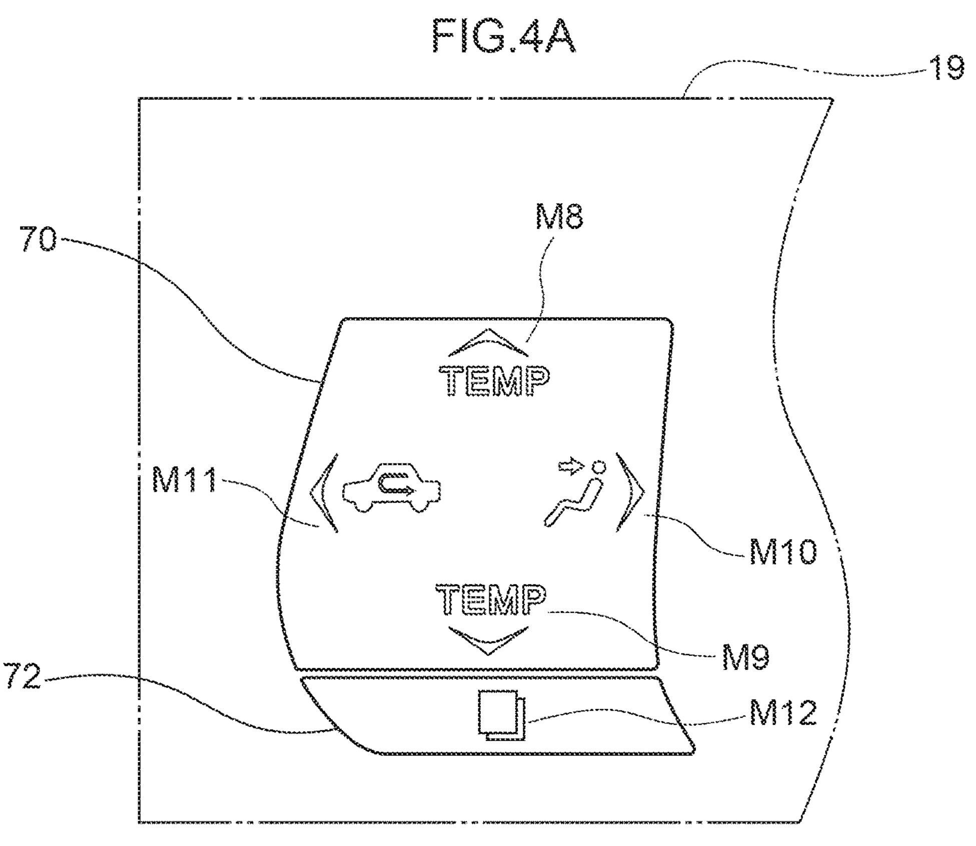
FIG. 4A is a drawing illustrating a display example of the display portion in the present embodiment, and illustrates the first layer of the left-side switch.
Figure 4B:
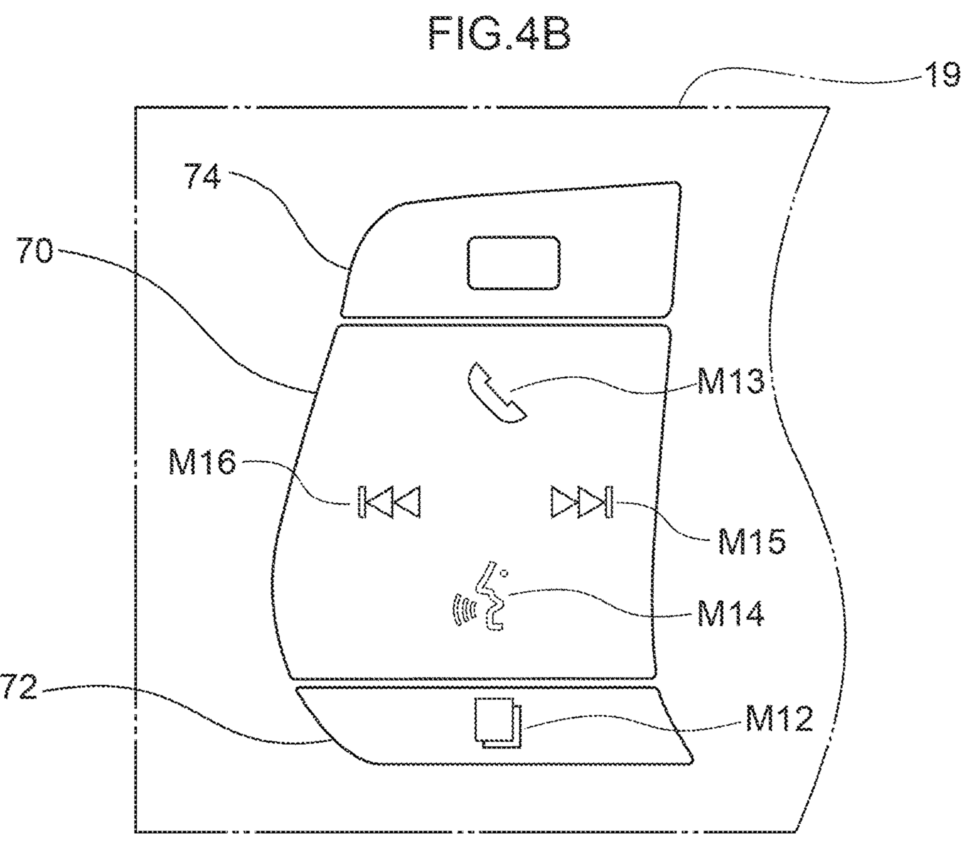
FIG. 4B is a drawing illustrating a display example of the display portion in the present embodiment, and illustrates a second layer of the left-side switch.

The first layer of the display of the gauge display 19 corresponding to the left-side switch 20L is illustrated in FIG. 4A. In this state, due to the vehicle occupant carrying out an "executing action" with respect to the left-side lower switch 54, the display of the gauge display 19 is switched to display of the second layer illustrated in FIG. 4B.

In the second layer, icons M13 through M16 are displayed so as to be superposed on the left-side central frame portion 70. Mainly functions of operating onboard equipment corresponding to phone calls, the audio system and voice input are assigned to these icons M13 through M16. Further, in this second layer, a left-side upper frame portion 74 modeled after the thumbwheel switch 52 is displayed above the left-side central frame portion 70.

The icon M13 is a shape modeled after a telephone, and corresponds to the function of a phone call. The icon M14 is a shape imitating a state in which the vehicle occupant is speaking, and corresponds to the voice recognition function. The icons M15 and M16 are shapes of arrows indicating the leftward and rightward directions, and correspond to the functions of rewinding and fast forwarding in the audio system.

The left-side upper frame portion 74 is displayed above the left-side central frame portion 70. The left-side upper frame portion 74 is an icon modeled after the thumbwheel switch 52 to which the volume adjusting operation of the audio system is assigned. Namely, similarly to the icons M15 and M16 of the left-side central frame portion 70, operations relating to the audio system that is an onboard device are assigned to the thumbwheel switch 52 expressed by the left-side upper frame portion 74. Accordingly, in the state in which the display of the gauge display 19 is switched to the second layer, due to an operation of a touch-sensor-type switch being carried out, the icon of the thumbwheel switch 52 is displayed in addition to the icons corresponding to the left-side central switch 50. Due thereto, the vehicle occupant can, while operating the left-side central switch 50, intuitively grasp the existence of the thumbwheel switch 52 that has a strong functional relation thereto.

Further, in the second layer of the left-side central switch 50, when a touch operation, in which operating finger P1 of the vehicle occupant is slid on the surface of the left-side central switch 50 in the direction in which the thumbwheel switch 52 is disposed, is sensed, the left-side central frame portion 70, the left-side lower frame portion 72 and the left-side upper frame portion 74 are set in non-displayed states. Further, operation information Q2 of the thumbwheel switch 52 is displayed on the display portion.

Figure 5:
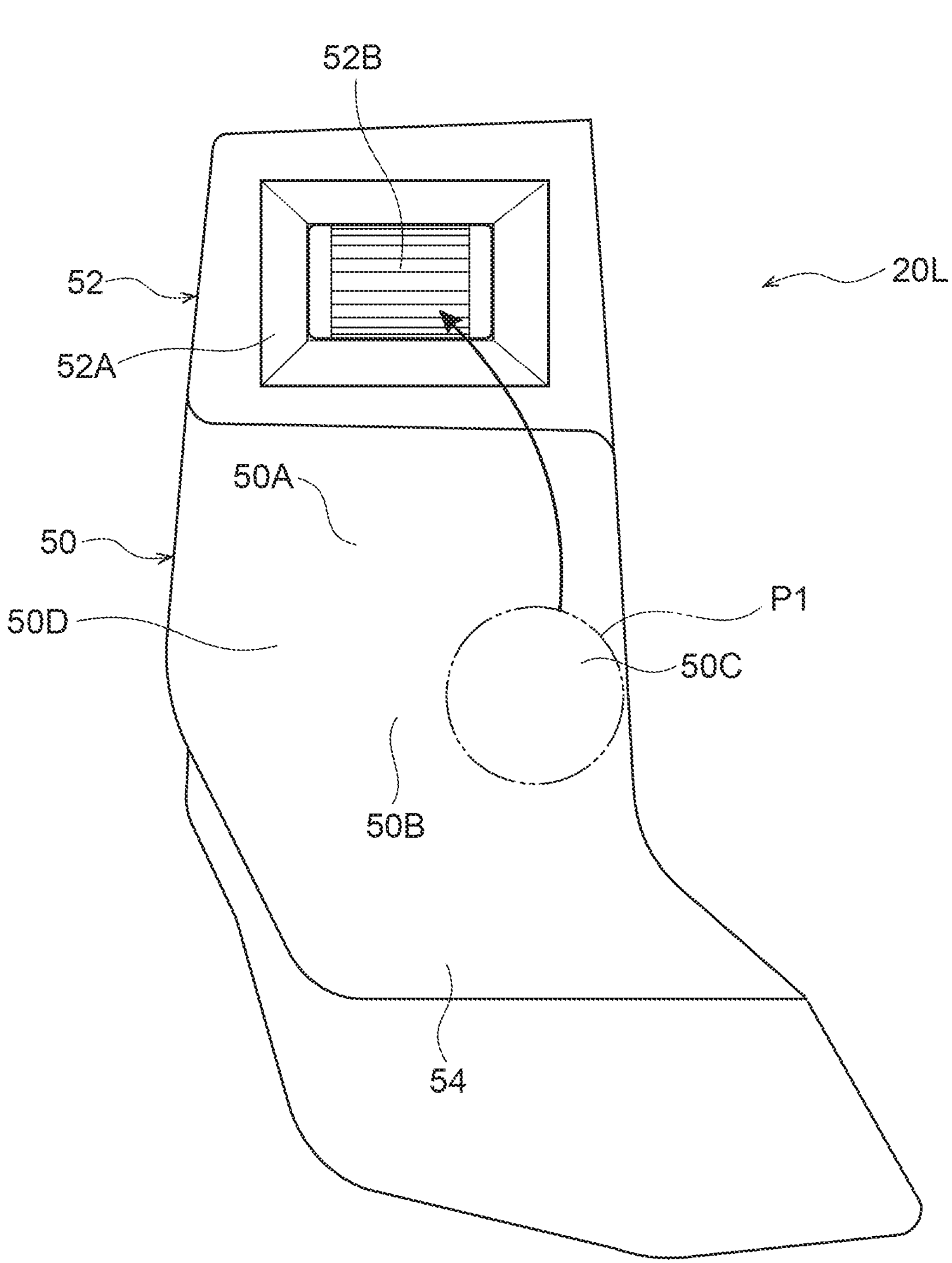
FIG. 5 is a drawing explaining a touch operation in which an operating finger is slid on the surface of the left-side switch.
Figure 6A:
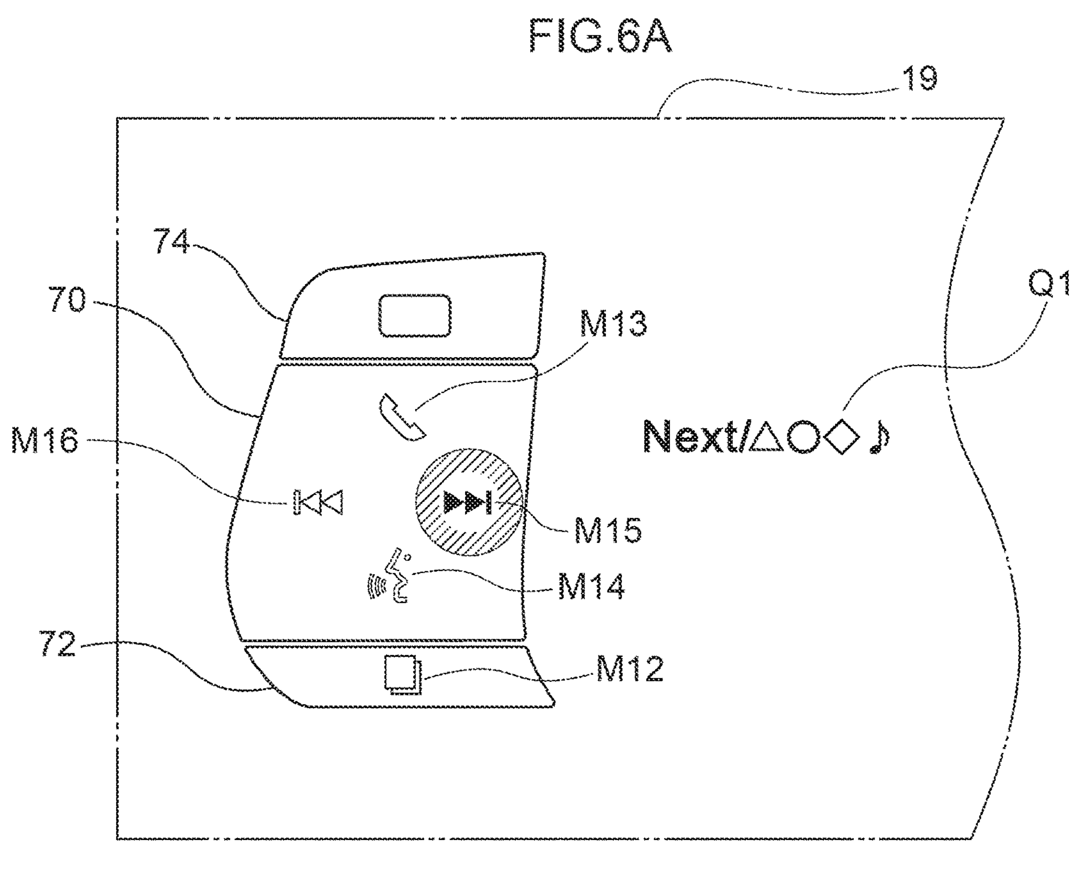
FIG. 6A is a drawing illustrating a display example of the display portion before and after the touch operation that is explained in FIG. 5, and illustrates a display example before the touch operation.
Figure 6B:
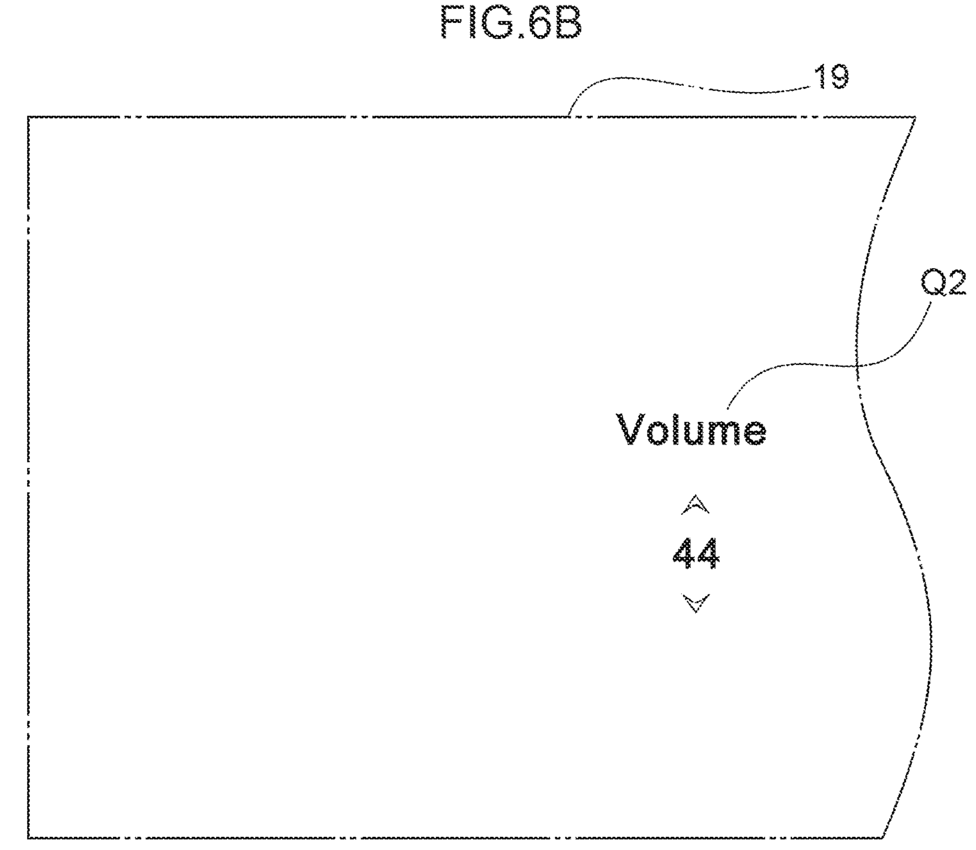
FIG. 6B is a drawing illustrating a display example of the display portion before and after the touch operation that is explained in FIG. 5, and illustrates a display example after the touch operation.

A display example of a case in which the operating finger P1 of the vehicle occupant is slid from the right switch 50C of the left-side central switch 50 toward the upper side where the thumbwheel switch 52 is provided, is described as an example with reference to FIG. 5, FIG. 6A and FIG. 6B.

As illustrated in FIG. 5, before and after the operating finger P1 is slid, display of the image corresponding to the left-side switch 20L is switched from the display of FIG. 6A to the display of FIG. 6B.

In FIG. 6A, the touch operation of the right switch 50C on which the operating finger P1 is placed is sensed by the display control device 10 for a vehicle. In this state, the left-side central frame portion 70, the left-side lower frame portion 72, the left-side upper frame portion 74 and the icons M13 through M16 are displayed on the display screen of the gauge display 19. Namely, icons corresponding to both the touch-sensor-type switches and the non-touch-sensor-type switch that are provided at the left-side switch 20L are displayed. Due thereto, the vehicle occupant can intuitively grasp the arrangement of the plural switches by looking at the display screen at the time of operating the flat surface of the left-side central switch 50.

Further, in this state, the icon M15, which corresponds to the right switch 50C that the operating finger P1 has touched, is displayed so as to be emphasized more than the other icons. Moreover, information Q1 relating to the operation of fast forwarding that is assigned to the right switch 50C is displayed adjacent to the icon M15 as "operation information". Due thereto, the operation of the touch-sensor-type switch is displayed in an emphasized manner.

Next, when the operating finger P1 is slid in the direction in which the thumbwheel switch 52 is located, the icons corresponding to the switches are set in non-displayed states in the display screen, and only the "operation information" of the thumbwheel switch 52 is displayed. Due thereto, the display screen can be switched before the thumbwheel switch 52 is operated.

Further, by setting the icons that correspond to the switches in non-displayed states, it can instinctively be understood that the type of the switch has been switched to a type that is different than a touch-sensor-type. Further, because the amount of visual information is decreased, it is easy for the vehicle occupant to rely on tactile sensation information obtained from the operating finger P1, and it is easy for the vehicle occupant to grasp the type of operation of the thumbwheel switch 52.

In the example illustrated in FIG. 6B, information relating to volume operation of the audio system is displayed as the "operation information" of the thumbwheel switch 52. "Operation information Q2" of the thumbwheel switch 52 is displayed at the same position as the display of the "operation information Q1" corresponding to the touch-sensor-type switch. Due thereto, also after the icon corresponding to the switch has been switched to the non-displayed state, a sense of unease of the vehicle occupant relating to operability can be suppressed.

Note that switching to the display image illustrated in FIG. 6B is carried out also in a case in which an input operation to the thumbwheel switch 52 is carried out directly without sliding the operating finger P1.

(Example of Display Processing)

An example of the flow of display processing relating to the display of the second layer of the left-side switch 20L by the display control device 10 for a vehicle is described next with reference to the flowchart of FIG. 9. This display processing is executed at the time when, due to an input operation of the left-side lower switch 54, the display of the display portion corresponding to the left-side central switch 50 is switched to the second layer. This display processing is carried out due to the CPU 26 reading-out a program from the ROM 28 or the storage 32, and expanding and executing the program in the RAM 30.

Figure 9:
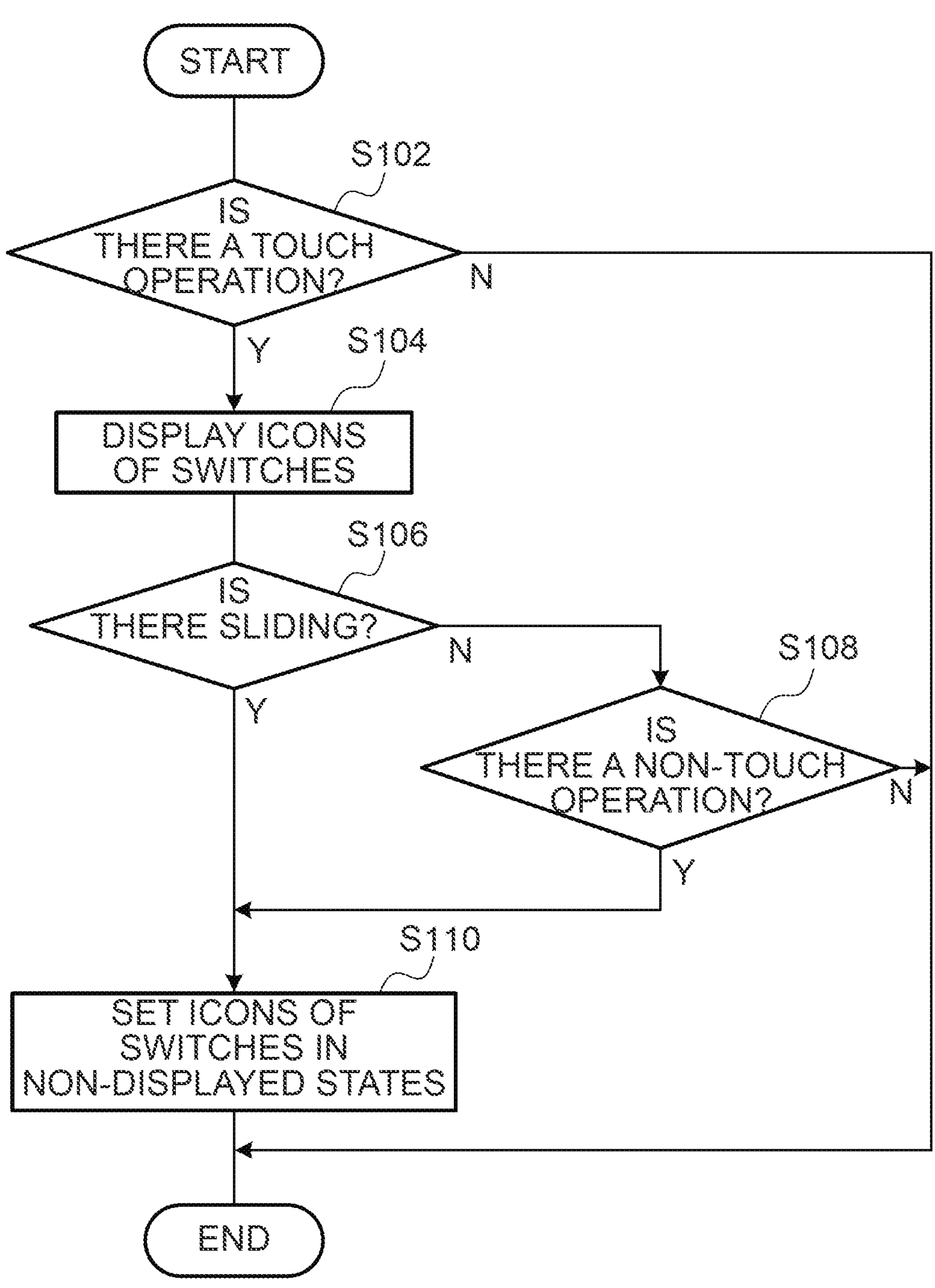
FIG. 9 is a flowchart illustrating an example of the flow of display processing by the display control device for a vehicle relating to the present embodiment.

As illustrated in FIG. 9, in step S102, by the function of the operation sensing section 82, the CPU 26 judges whether or not a touch operation with respect to a touch-sensor-type switch (the left-side central switch 50 and the left-side lower switch 54) has been sensed. If the CPU 26 judges that a touch operation has been sensed, the CPU 26 moves on to the processing of step S104. Further, if the CPU 26 judges that a touch operation has not been sensed, the CPU 26 ends the display processing.

In step S104, the CPU 26 displays icons corresponding to the left-side switch 20L (the left-side central switch 50, the left-side lower switch 54 and the thumbwheel switch 52). Thereafter, the CPU 26 moves on to the processing of step S106.

In step S106, by the function of the operation sensing section 82, the CPU 26 judges whether or not there has been sensed a touch operation of the operating finger of the vehicle occupant sliding on the surface of a touch-sensor-type switch in the direction in which a non-touch-sensor-type switch is located. If the CPU 26 judges that sliding has been sensed, the CPU 26 moves on to the processing of step S110. Further, if the CPU 26 judges that sliding has not been sensed, the CPU 26 moves on to the processing of step S108 without switching the display of the display portion.

In step S108, by the function of the operation sensing section 82, the CPU 26 judges whether or not an operation with respect to the non-touch-sensor-type switch (the thumbwheel switch 52) has been sensed. If operation of the non-touch-sensor-type switch has been sensed, the CPU 26 moves on to the processing of step S110. Further, if operation of the non-touch-sensor-type switch has not been sensed, the CPU 26 ends the display processing.

In step S110, the CPU 26 sets the icons corresponding to the left-side switch 20L in non-displayed states, and displays operation information relating to the onboard device assigned to the non-touch-sensor-type switch (the thumbwheel switch 52). Thereafter, the CPU 26 ends the display processing.

Effects

As described above, in the display control device 10 for a vehicle of the present embodiment, in a case in which a touch operation of a touch-sensor-type switch provided on the steering wheel 18 is sensed, both an icon corresponding to the touch-sensor-type switch and an icon corresponding to a non-touch-sensor-type switch are displayed (FIG. 6A). Due thereto, at the touch-sensor-type switch at which it is difficult to obtain an operational feeling from the tactile sensation, due to the icon corresponding to the touch-sensor-type switch being grasped visually, the operability is good, and the type of switch can be understood. Further, it is easy to grasp the existence of the non-touch-sensor-type switch due to the display of the icon corresponding to the non-touch-sensor-type switch in the state in which the vehicle occupant has touched the touch-sensor-type switch. Therefore, the operating finger P1 can be moved smoothly from the touch-sensor-type switch to the non-touch-sensor-type switch without the vehicle occupant looking at the operation portion of the steering wheel 18.

On the other hand, as illustrated in FIG. 6B, in a case in which a non-touch operation of the non-touch-sensor-type switch is sensed, at the display portion, both the icon corresponding to the touch-sensor-type switch and the icon corresponding to the non-touch-sensor-type switch are set in non-displayed states. Due thereto, at the time of operation of the non-touch-sensor-type switch, the amount of information obtained from the display portion is reduced, and due thereto, it is easy for the vehicle occupant to rely on information obtained by tactile perception by using his/her operating finger or the like. As a result, by making it easy to feel the tactile sensation of the surface of the non-touch-sensor-type switch, the operability is good, and the type of the switch can be understood.

As illustrated in FIG. 6A, in a case in which a touch operation of the touch-sensor-type switch is sensed, the icon of the touch-sensor-type switch is displayed so as to be emphasized more than the icon of the non-touch-sensor-type switch. Moreover, operation information relating to the onboard device assigned to the touch-sensor-type switch that is operated is displayed. Due thereto, even in a case in which both the icon of the touch-sensor-type switch and the icon of the non-touch-sensor-type switch are displayed on the display portion, operation of the touch-sensor-type switch can be grasped intuitively due to the emphasized display of the icon of the touch-sensor-type switch.

Further, in the present embodiment, as illustrated in FIG. 5, even in a case in which it is sensed that the operating finger P1 of the vehicle occupant has been slid on the surface of the touch-sensor-type switch in the direction in which the non-touch-sensor-type switch is located, the icons corresponding to the switches are set in non-displayed states (FIG. 6B). Specifically, both the icon corresponding to the touch-sensor-type switch and the icon corresponding to the non-touch-sensor-type switch are set in non-displayed states, and the display is switched to display of operation information of the non-touch-sensor-type switch. Due thereto, operation of the non-touch-sensor-type switch is predicted, and operation information of the non-touch-sensor-type switch can be presented to the vehicle occupant in advance.

Further, in the present embodiment, the onboard device assigned to the touch-sensor-type switch can be changed by switching the layer displayed on the display portion. In a case in which the onboard device that is assigned to the touch-sensor-type switch is related to the onboard device assigned to the non-touch-sensor-type switch, both the icon corresponding to the touch-sensor-type switch and the icon corresponding to the non-touch-sensor-type switch are displayed on the display portion. Due thereto, in a case in which there is a strong possibility that the non-touch-sensor-type switch will be operated after the touch-sensor-type switch is operated, the icon corresponding to the non-touch-sensor-type switch can be displayed.

On the other hand, in a case in which the onboard device assigned to the first switch is not related to the onboard device assigned to the second switch, the first icon is displayed on the display portion, and the second icon is set in a non-displayed state. Due thereto, in a case in which the possibility that the non-touch-sensor-type switch will be operated after the touch-sensor-type switch is operated is low, the displayed contents can be made to be easy to understand by hiding the icon that has low priority.

Supplemental Description

Although an embodiment has been described above, the present invention can, of course, be implemented in various forms within a scope that does not depart from the gist thereof. For example, although the present embodiment is structured such that an electrostatic capacitance sensor is used in detecting touch operations, the present disclosure is not limited to this, and a known sensor such as a pressure sensor or the like may be used instead.

Although the above embodiment describes an example of displaying on the gauge display, similar displays may be displayed from the head-up display onto the display screen 17 of the windshield glass 16.

The above embodiment describes an example in which a thumbwheel switch is provided as an example of the non-touch-sensor-type switch that is provided at the steering switch group, but the present disclosure is not limited to this. The non-touch-sensor-type switch may be structured by, for example, an electrical-contact-detecting-type push switch.

Moreover, any of various types of processors other than the CPU 26 may execute the processing that is executed due to the CPU 26 reading-in a program in the above-described embodiment. Examples of processors in this case include PLDs (Programmable Logic Devices) whose circuit structure can be changed after production such as FPGAs (Field-Programmable Gate Arrays) and the like, and dedicated electrical circuits that are processors having circuit structures that are designed for the sole purpose of executing specific processings such as ASICs (Application Specific Integrated Circuits) and the like, and the like. Further, the above-described processing may be executed by one of these various types of processors, or may be executed by a combination of two or more of the same type or different types of processors, e.g., plural FPGAs, or a combination of a CPU and an FPGA, or the like. Further, the hardware structures of these various types of processors are, more specifically, electrical circuits that combine circuit elements such as semiconductor elements and the like.

Further, the above embodiment is a structure in which various data are stored in the storage 32, but the present disclosure is not limited to this. For example, a non-transitory recording medium such as a CD (Compact Disk), a DVD (Digital Versatile Disk), a USB (Universal Serial Bus) memory or the like may be used as the storage. In this case, various programs and data and the like are stored in these recording media.

What is claimed is:

1. A display control device for a vehicle, the device comprising:

a memory; and at least one processor coupled to the memory, wherein:

the processor is configured to:

display, at a display portion provided at a front side of a driver's seat, a plurality of icons corresponding to a steering switch group provided with a touch sensor-type first switch and a non-touch sensor-type second switch, wherein the plurality of icons include a first icon modeled after the first switch and a second icon modeled after the second switch, and sense a switching operation, wherein in response to sensing of a touch operation of the first switch, the processor is configured to display both the first icon and the second icon, and, wherein in response to sensing of a non-touch operation of the second switch, the processor is configured not to display any icon at locations where the first icon and the second icon had been displayed.

2. The display control device for a vehicle of claim 1, wherein, in response to sensing the touch operation of the first switch, the processor is configured to display the first icon modeled after the first switch so as to be emphasized more than the second icon, and display operation information relating to an onboard device that is assigned to the first switch.

3. The display control device for a vehicle of claim 1, wherein, in response to sensing the touch operation, in which an operating finger of a vehicle occupant slides on a surface of the first switch in a direction in which the second switch is located, is sensed, the processor is configured to render the first icon and the second icon into a non-displayed state, and display operation information relating to an onboard device assigned to the second switch.

4. The display control device for a vehicle of claim 1, wherein:

the first switch is structured such that an onboard device assigned to the first switch can be changed by switching of a layer displayed on the display portion, when an onboard device, which is related to an onboard device assigned to the second switch, is assigned to the first switch, in a case in which a touch operation of the first switch is sensed, the processor is configured to display both the first icon and the second icon, and when an onboard device, which is not related to the onboard device assigned to the second switch, is assigned to the first switch, in a case in which a touch operation of the first switch is sensed, the processor is configured to display the first icon and renders the second icon into a non-displayed state.

5. A display method for a vehicle, the method comprising:

displaying, at a display portion provided at a front side of a driver's seat, a plurality of icons corresponding to a steering switch group provided with a touch-sensor-type first switch and a non-touch-sensor-type second switch, wherein:

the plurality of icons include a first icon modeled after the first switch and a second icon modeled after the second switch, and wherein in response to sensing of a touch operation of the first switch, the method comprises displaying both the first icon and the second icon, and, in response to sensing of a non-touch operation of the second switch, the method comprises not displaying any icon at locations where the first icon and the second icon had been displayed.

6. A non-transitory recording medium for a vehicle, the medium storing a program executable by a computer to perform processing comprising:

displaying, at a display portion provided at a front side of a driver's seat, a plurality of icons corresponding to a steering switch group provided with a touch-sensor-type first switch and a non-touch-sensor-type second switch, the plurality of icons including a first icon modeled after the first switch and a second icon modeled after the second switch; and wherein in response to sensing of a touch operation of the first switch, displaying both the first icon and the second icon, and, in response to sensing of a non-touch operation of the second switch, not displaying any icon at locations where the first icon and the second icon had been displayed.

* * * * *